United States Patent [19]
Chang et al.

[11] Patent Number: 5,162,420
[45] Date of Patent: Nov. 10, 1992

[54] AQUEOUS COMPOSITIONS BASED ON ACID-FUNCTIONAL ACRYLIC SILANOL POLYMERS

[75] Inventors: Wen-Hsuan Chang, Gibsonia; Edward E. McEntire, Allison Park; Marvin L. Kaufman, Pittsburgh, all of Pa.

[73] Assignee: PPG Industries, Inc., Pittsburgh, Pa.

[21] Appl. No.: 707,250

[22] Filed: May 22, 1991

Related U.S. Application Data

[63] Continuation of Ser. No. 388,173, Jul. 31, 1989, abandoned.

[51] Int. Cl.$^5$ ............................................. C08L 13/02
[52] U.S. Cl. .................................. 524/457; 524/458; 524/558; 524/560
[58] Field of Search ................ 524/547, 548, 558, 560

[56] References Cited

U.S. PATENT DOCUMENTS

| | | |
|---|---|---|
| 3,706,697 | 12/1972 | Backderf . |
| 3,729,438 | 4/1973 | Plesich et al. . |
| 3,814,716 | 6/1974 | Kowalski et al. . |
| 3,951,893 | 4/1976 | Gander . |
| 3,966,687 | 6/1978 | Ribba . |
| 4,097,436 | 6/1978 | Buning et al. . |
| 4,267,093 | 5/1981 | Hass et al. . |
| 4,399,261 | 8/1983 | Kato et al. . |

FOREIGN PATENT DOCUMENTS

| | | |
|---|---|---|
| 0276469A1 | 8/1988 | European Pat. Off. . |
| 0282000A2 | 9/1988 | European Pat. Off. . |
| 59-067396 | 4/1984 | Japan . |

OTHER PUBLICATIONS

Orbit Information Technologies, Abstract DE35333-77-A.
Orbit Information Technologies, Abstract DE32331-71-A.
Orbit Information Technologies, Abstract J59067396-A.

*Primary Examiner*—Joseph L. Schofer
*Assistant Examiner*—Jeffrey T. Smith
*Attorney, Agent, or Firm*—Thomas M. Breininger; Linda Pingitore

[57] ABSTRACT

Disclosed is an aqueous composition containing a vinyl-type polymer product having hydrolyzable silyl groups which aqueous composition is stable at relatively high solids for such a composition and yet cures at relatively low temperatures upon the evaporation of water. More particularly, disclosed is a stable, aqueous, colloidal silica-free, dispersion or solution containing a solution-polymerized vinyl-type polymer having acid functionality sufficient to provide an acid value of from 5 to 160 and having a hydroxyl value of less than or equal to 10 and sufficient hydrolyzable silyl groups to provide a Si content in the range of from 0.40 to 6.0 percent by weight based on the total weight of the vinyl-type polymer. The vinyl-type polymer is characterized in that a composition consisting of at least 25 percent by weight of the polymer in water remains stable in a closed container for at least 24 hours at a temperature of 48.9 degrees Celsius.

Also disclosed is a stable, aqueous, colloidal silica-free, coating composition having a total organic resin solids content of greater than or equal to 25 percent by weight, at least 50 percent by weight of the total organic resin solids content consisting of the aforesaid solution-polymerized vinyl-type polymer.

24 Claims, No Drawings

AQUEOUS COMPOSITIONS BASED ON ACID-FUNCTIONAL ACRYLIC SILANOL POLYMERS

This application is a continuation of application Ser. No. 388,173, filed Jul. 31, 1989, now abandoned.

BACKGROUND OF THE INVENTION

The present invention is directed to aqueous dispersions or solutions containing solution-polymerized vinyl-type polymers having acid functionality and hydrolyzable silyl groups, more particularly to such compositions which can be cured at low temperatures and have good storage stability.

There is a continuing need, particularly in the coatings industry, to provide compositions which have low curing temperatures and, preferably, which cure at ambient temperature. There is also a continuing need to provide compositions which contain ever lower concentrations of volatile organic components. Additionally, it would be desirable to provide compositions which do not depend on organic isocyanates for curing.

However, previous approaches to meet these challenges generally have involved disadvantageous compromises among desirable coating composition properties such as molecular weight of the principal film forming resin, application viscosity of the composition, low curing temperature, storage stability of the coating composition and desirable properties of the cured film such as solvent resistance, gloss, hardness, water resistance, flexibility, etc.

Objects of the present invention are to help meet these challenges. Other objects of the invention will become apparent to the reader infra.

SUMMARY OF THE INVENTION

The present invention provides for an aqueous composition containing a vinyl-type polymer product having hydrolyzable silyl groups which aqueous composition has a surprising combination of characteristics, particularly the combination of stability at relatively high solids at high temperature (e.g., 120° F.) for such a composition and yet curability at relatively low temperatures upon the evaporation of water. Aqueous compositions of the invention can be used in coating compositions which can provide films that are water insensitive upon curing.

More particularly, the present invention is for a stable, aqueous, colloidal silica-free, dispersion or solution containing a solution-polymerized vinyl-type polymer having acid functionality sufficient to provide an acid value of from 5 to 160 and having a hydroxyl value of less than or equal to 10 and sufficient hydrolyzable silyl groups to provide a Si content in the range of from 0.40 to 6.0 percent by weight based on the total weight of the vinyl-type polymer. The vinyl-type polymer is characterized in that a composition consisting of at least 25 percent by weight of the polymer in water remains stable in a closed container for at least 24 hours at a temperature of 48.9 degrees Celsius. As used herein, the term "stable" is intended to mean that the relevant composition is still fluid (i.e., ungelled) at the end of the period of storage.

The present invention also provides for a stable, aqueous, colloidal silica-free, coating composition having a total organic resin solids content of greater than or equal to 25 percent by weight, at least 50 percent by weight of the total organic resin solids content consisting of the aforesaid solution-polymerized vinyl-type polymer.

DETAILED DESCRIPTION OF THE INVENTION

An aqueous dispersion or solution of the invention comprises a solution-polymerized vinyl-type polymer. The vinyl-type polymer has acid functionality sufficient to provide an acid value of from 5 to 160, preferably from 10 to 120. The aforesaid acid functionality allows the vinyl-type polymer to be solubilized or dispersed in water upon at least partial neutralization of acid groups with an appropriate base. The vinyl-type polymer also has sufficient hydrolyzable silyl groups to provide a silicon (i.e., Si) content in the range of from 0.40 to 6.0, preferably from 0.50 to 3.0, percent by weight based on the total weight of the vinyl-type polymer. Typically, the Si atoms of the hydrolyzable silyl groups on the vinyl-type polymer are separated by at least two atoms from the backbone of the polymer. Moreover, a vinyl-type polymer for an aqueous dispersion or solution of the invention typically has a hydroxyl value of less than or equal to 10. While the molecular weight of a vinyl-type polymer may vary, the solution polymerized vinyl-type polymer, prior to dispersion (or solubilization) in water, typically has a number average molecular weight of less than or equal to 12,000, and for preferred embodiments preferably less than or equal to 10,000, as determined by gel permeation chromatography utilizing a polystyrene standard.

An important additional characteristic of the vinyl-type polymer suitable for an aqueous dispersion or solution of the invention is that a composition consisting of at least 25 percent by weight of the polymer in water remains stable in a closed container for at least 24 hours at a temperature of 48.9 degrees Celsius. Moreover, an aqueous dispersion or solution of the invention is colloidal silica-free, that is, it is substantially free of dispersed $SiO_2$ having particle size of from about 4 to about 100 nanometers. Generally, an aqueous dispersion or solution of the invention will contain less than 10 parts by weight solids of such dispersed colloidal silica per 100 parts by weight solids of the vinyl-type polymer. Preferred aqueous dispersions or solutions of the invention remain stable for at least one week at a temperature of 48.9 degrees Celsius.

Heretofore, it commonly has been believed that polymers containing hydrolyzable silyl groups would be expected to have only very limited, if any, stability in water given the tendency for such hydrolyzable silyl groups to hydrolyze and condense to form siloxane bridges in the presence of moisture. Moreover, the problem of stability becomes increasingly more difficult as the concentration of hydrolyzable silyl group-containing polymer solids in water increases. Nevertheless, it surprisingly has been found that aqueous compositions of the invention, even at their relatively high concentrations of hydrolyzable silyl-group containing polymer, can remain adequately stable for effective utilization in coatings applications even at high temperature (for accelerated testing purposes). And yet, wet films (coatings) from aqueous compositions of the invention surprisingly cure at low temperatures, preferably at ambient temperature, upon the evaporation of water from the composition. Typically, a 3 mil thick wet film of an aqueous dispersion or solution of the invention, containing an amount of basic catalyst of from 0.1 to 3.0, usually from 0.4 to 1.0, milliequivalent/gram of polymer, cures in air to a solvent resistant film at a temperature of less than 80 degrees Celsius (°C.), preferably at equal to or less than 60° C., and more preferably at ambient temperature (i.e., at less than or equal to 25° C.).

The choice of solution-polymerized, vinyl-type polymer for an aqueous solution or dispersion of the invention is not particularly limited provided that it contains the aforesaid acid functionality, hydrolyzable silyl groups and stability in aqueous medium as described above. By way of more specifically illustrating suitable solution-polymerized, vinyl-type polymers for aqueous compositions of the invention, examples are described infra in which the solution-polymerized vinyl-type polymer is prepared from the addition copolymerization of components comprising an ethylenically unsaturated silane monomer containing at least one hydrolyzable silyl group, an ethylenically unsaturated acid and/or anhydride thereof, and at least one other copolymerizable vinyl-type monomer.

Examples of ethylenically unsaturated silane monomers include: ethylenically unsaturated alkoxy silanes and ethylenically unsaturated acyloxy silanes, more specific examples of which include acrylatoalkoxysilanes such as gamma-acryloxypropyl trimethoxysilane and gamma-acryloxypropyl triethoxysilane and methacrylatoalkoxysilanes such as gamma-methacryloxypropyl trimethoxysilane, gamma-methacryloxypropyl triethoxysilane and gamma-methacryloxypropyl tris-(2-methoxyethoxy) silane; acyloxysilanes including, for example, acrylato acetoxysilanes, methacrylato acetoxysilanes and ethylenically unsaturated acetoxysilanes such as acrylatopropyl triacetoxysilane and methacrylatopropyl triacetoxysilane. Of the aforesaid ethylenically unsaturated silane monomers, it is preferred to utilize monomers which upon vinyl addition copolymerization will result in vinyl-type polymer products in which the Si atoms of the hydrolyzable silyl groups on the vinyl-type polymer are separated by at least two atoms from the backbone of the polymer.

Examples of ethylenically unsaturated acids and/or anhydrides thereof which may be used to prepare a vinyl-type polymer for an aqueous solution or dispersion of the invention include: acrylic acid, methacrylic acid, itaconic acid, crotonic acid, maleic acid, maleic anhydride, citraconic anhydride, itaconic anhydride, ethylenically unsaturated sulfonic acids and/or anhydrides such as sulfoethyl methacrylate, and half esters of maleic and fumaric acids, such as butyl hydrogen maleate and ethyl hydrogen fumarate in which one carboxyl group is esterified with an alcohol. Ethylenically unsaturated carboxylic acids and/or anhydrides thereof are preferred.

Examples of other copolymerizable vinyl-type monomers which may be vinyl addition copolymerized with the aforesaid ethylenically unsaturated silane monomers and ethylenically unsaturated acids and/or anhydrides thereof to make a vinyl-type polymer for preparing an aqueous solution or dispersion of the invention include: the alkyl acrylates, such as methyl acrylate, ethyl acrylate, butyl acrylate, propyl acrylate, 2-ethylhexyl acrylate and isobornyl acrylate; the alkyl methacrylates, such as methyl methacrylate, butyl methacrylate, 2-ethylhexyl methacrylate, decyl methacrylate, lauryl methacrylate and isobornyl methacrylate; hydroxyalkyl acrylates and methacrylates such as hydroxyethyl acrylate, hydroxypropyl acrylate, hydroxyethylmethacrylate and hydroxypropyl methacrylate; N-alkoxymethyl acrylamides and methacrylamides such as N-butoxymethyl acrylamide, N-butoxymethyl methacrylamide, N-ethoxymethyl acrylamide and N-ethoxymethyl methacrylamide; epoxy functional ethylenically unsaturated monomers such as glycidyl methacrylate and glycidyl acrylate; and unsaturated nitriles, such as acrylonitrile, methacrylonitrile and ethacrylonitrile. Other ethylenically unsaturated monomers (vinyl monomers) which can be used in addition to the aforesaid vinyl-type monomers include: vinyl aromatic hydrocarbons (optionally substituted, for example, by halo atoms) such as styrene, alpha-methyl styrene, alpha-chloromethyl styrene and vinyl toluene; and vinyl aliphatic hydrocarbons (optionally substituted, for example, by halo atoms) such as vinyl acetate and vinyl chloride.

Although the components for preparing the vinyl-type polymer where desired may include hydroxyl-functional, ethylenically unsaturated monomers such as the hydroxyalkyl acrylates and methacrylates described above, it has been found that stable aqueous solutions or dispersions of the invention can be prepared without utilization of such hydroxyl-functional monomers for the vinyl-type polymer, and typically, vinyl-type polymers for aqueous compositions of the present invention are prepared from components essentially or completely free of such hydroxyl-functional, ethylenically unsaturated monomers. For example, the vinyl-type polymer typically has a hydroxyl value of less than or equal to 10.

When the solution-polymerized, vinyl-type polymer is prepared from the addition copolymerization of components as described above, typically from 5 to 13 percent by weight of the ethylenically unsaturated acid and/or acid anhydride thereof and from 12 to 87 percent by weight of the other copolymerizable vinyl-type monomer are employed (the percentages being based on the total weight of copolymerizable monomers used in the preparation of the vinyl-type polymer). The amount of the ethylenically unsaturated silane monomer typically is chosen to provide a silicon content of the vinyl-type polymer in the range of from 0.40 to 6.0, preferably from 0.50 to 3.0, percent by weight based on the total weight of the vinyl-type polymer.

Typically, the vinyl-type polymer is formed by solution interpolymerizing the ethylenically unsaturated monomers in the presence of a vinyl polymerization initiator, examples of which include: azo compounds such as alpha alpha'-azobis(isobutyronitrile), 2,2'-azobis (methylbutyronitrile) and 2,2'-azobis(2,4-dimethylvaleronitrile); peroxides such as benzoyl peroxide, cumene hydroperoxide and t-amylperoxy-2-ethylhexanoate; tertiary butyl peracetate; tertiary butyl perbenzoate; isopropyl percarbonate; butyl isopropyl peroxy carbonate; and similar compounds. The quantity of initiator employed can be varied considerably; however, in most instances, it is desirable to utilize from about 0.1 to about 10 percent by weight of initiator based on the total weight of copolymerizable monomers employed. A chain modifying agent or chain transfer agent may be added to the polymerization mixture. The mercaptans, such as dodecyl mercaptan, tertiary dodecyl mercaptan, octyl mercaptan, hexyl mercaptan and the mercaptoalkyl trialkoxysilanes such as 3-mercaptopropyl trimethoxysilane may be used for this purpose as well as other chain transfer agents such as cyclopentadiene, allyl acetate, allyl carbamate, and mercaptoethanol.

The polymerization reaction for the mixture of monomers to prepare the vinyl-type polymer can be carried out in an organic solvent medium utilizing conventional solution polymerization procedures which are well known in the addition polymer art as illustrated with particularity in, for example, U.S. Pat. Nos. 2,978,437; 3,079,434 and 3,307,963. Organic solvents which may be utilized in the polymerization of the monomers include virtually any of the organic solvents heretofore employed in preparing acrylic or vinyl polymers such as, for example, alcohols, ketones, aromatic hydrocarbons or mixtures thereof. Illustrative of organic solvents of the above type which may be employed are alcohols such as lower alkanols containing 2 to 4 carbon atoms including ethanol, propanol, isopropanol, and butanol; ether alcohols such as ethylene glycol monoethyl ether, ethylene glycol monobutyl ether, propylene glycol monomethyl ether, and dipropylene glycol monoethyl ether; ketones such as methyl ethyl ketone, methyl N-butyl ketone, and methyl isobutyl ketone; esters such as butyl acetate; and aromatic hydrocarbons such as xylene, toluene, and naphtha.

The vinyl polymerization of the ethylenically unsaturated components generally can be conducted at from 0° C. to 150° C., typically is conducted at from 50° C. to 150° C., and usually at from 80° C. to 120° C.

As mentioned previously, the choice of solution-polymerized, vinyl-type polymer for an aqueous solution or dispersion of the invention is not particularly limited provided that it contains the aforesaid acid functionality, hydrolyzable silyl groups and stability in aqueous medium as described above. For example, another way of preparing suitable solution-polymerized, vinyl-type polymers for aqueous compositions of the invention, is by vinyl addition copolymerizing components comprising an ethylenically unsaturated anhydride and at least one other copolymerizable vinyl-type monomer wherein amino functionality of an amino-functional compound containing at least one hydrolyzable silyl group has been reacted with an anhydride group of the vinyl-type polymer. More specifically, for example, an ethylenically unsaturated anhydride and at least one other copolymerizable vinyl-type monomer (which does not contain a hydrolyzable silyl group) can be vinyl addition polymerized in an organic solvent as described above utilizing a vinyl polymerization initiator as described above to form an intermediate vinyl polymer product. Thereafter, anhydride functionality from the resulting intermediate product is reacted with amino functionality from an amino-functional compound containing hydrolyzable silyl groups to produce the vinyl-type polymer product for preparation of an aqueous solution or dispersion of the invention.

Examples of amino-functional compounds containing hydrolyzable silyl groups which may be utilized in the reaction with anhydride functionality from the aforesaid intermediate vinyl polymer product include: gamma-aminopropyl trimethoxysilane, gamma-aminopropyl triethoxysilane, beta-aminoethyl triethoxysilane, gamma-aminopropylmethyl diethoxysilane, gamma-aminopropylethyl diethoxysilane, gamma-aminopropylphenyl diethoxysilane, delta-aminobutyl triethoxysilane, delta-aminobutylethyl diethoxysilane and $(CH_3O)_3Si—(CH_2)_3—NH—(CH_2)_3—Si(OCH_3)_3$.

Dispersion or solubilization of the vinyl-type polymer in water is typically carried out via at least partial neutralization of acid functionality of the polymer with a base such as ammonia, an amine or a mixture thereof.

Examples of amines which may be utilized include: aliphatic amines such as monoethylamine, diethylamine and triethylamine; alkanolamines such as dimethylethanol amine, monoethanol amine, diethanol amine and triethanol amine; and cyclic amines such as pyridine and piperidine. In many cases ammonia is preferred for low temperature curing.

The relatively high solids concentration of an aqueous composition of the invention can be achieved either directly, for example so as to realize the high solids concentration upon solubilization or dispersion in aqueous medium, or can be achieved upon the stripping (e.g., under vacuum) of solvent and/or water from an aqueous solution or dispersion of the vinyl-type polymer.

A stable, aqueous, colloidal silica-free, coating composition of the invention has a total organic resin solids content of greater than or equal to 25 percent by weight. At least 50 percent by weight of the total organic resin solids content consists of a solution-polymerized vinyl-type polymer (as described herein previously) having acid functionality sufficient to provide an acid value of from 5 to 160 and sufficient hydrolyzable silyl groups to provide a Si content in the range of from 0.40 to 6.0, preferably from 0.50 to 3.0, percent by weight based on the total weight of the vinyl-type polymer, the vinyl-type polymer being further characterized in that a composition consisting of at least 25 percent by weight of the polymer in water remains stable in a closed container for at least 24 hours at a temperature of 48.9 degrees Celsius. An aqueous coating composition of the invention can comprise a solution polymerized, vinyl-type polymer as described previously herein as sole film-forming polymer. Or, the balance of the organic resin solids can be comprised of any compatible, organic resins. The term "compatible" in the preceding sentence is intended to mean that the compatible organic resin remain stable along with the vinyl-type polymer in aqueous dispersion or solution. Examples of organic resins include: organic film-forming, thermoplastic and/or thermosetting (crosslinking) resins, some examples of which include the generally known cellulosics, acrylics, aminoplasts, urethanes, polyesters, polyethers, polyamines, epoxies or mixtures thereof. Preferred coating compositions of the invention remain stable in a closed container for at least one week at 48.9 degrees Celsius.

In addition to the foregoing components, aqueous coating compositions of the invention may contain optional ingredients generally known for use in coating compositions such as various fillers; plasticizers; antioxidants; mildewcides and fungicides; surfactants; various flow control agents including, for example, thixotropes and additives for sag resistance and/or pigment orientation based on polymer microparticles (sometimes referred to as microgels) described for example in U.S. Pat. Nos. 4,025,474; 4,055,607; 4,075,141; 4,115,472; 4,147,688; 4,180,489; 4,242,384; 4,268,547; 4,220,679; and 4,290,932; and other such formulating additives. Additionally, where desired compositions of the invention may contain various solvents; and various pigments.

Pigments which may be utilized include both metallic flake pigments and various white and colored pigments. Examples of metallic flake pigments include generally known metallic flakes such as aluminum flakes, nickel flakes, tin flakes, silver flakes, chromium flakes, stainless steel flakes, gold flakes, copper flakes, and combinations thereof. Of the metallic flake pigments, nonleafing aluminum flakes are preferred. Examples of white and colored pigments include generally known pigments based on metal oxides; metal hydroxides; metal sulfides; metal sulfates; metal carbonates; carbon black; china clay; phthalo blues and green, organo reds, and other organic dyes.

Aqueous coating compositions of the invention may be applied over a wide variety of substrates such as wood, metals, glass, cloth, plastics, foams and the like, as well as over primers. They can be applied by any known method, including brushing, dipping, flow coating, roll coating, curtain coating etc., but preferred application is by spraying. Conventional spray techniques and equipment can be utilized.

Where desired, at the time of application to a substrate, an aqueous coating composition of the invention can contain at least a catalytically effective amount of a base for curing a wet film from the aqueous composition.

Preferred aqueous coating compositions of the invention are those characterized in that a 3 mil thick film of the composition containing an amount of basic catalyst of from 0.1 to 3.0, usually from 0.4 to 1.0, milliequivalent/gram of the solution polymerized vinyl-type polymer cures in air to a solvent resistant film at a temperature of less than 80 degrees Celsius, preferably at equal to or less than 25 degrees Celsius.

The following examples illustrate the invention and should not be construed at a limitation on the scope thereof. Unless specifically indicated otherwise, all percentages and amounts are understood to be by weight.

EXAMPLES 1 through 3

Examples 1 through 3 illustrate the preparation of solution polymerized, acid-functional, vinyl-type polymers for aqueous compositions of the invention.

To a reaction vessel fitted with a stirrer, thermometer, nitrogen inlet, condenser and addition funnels, is charged sufficient solvent to yield a final polymer concentration of 65 percent by weight solids. The solvent is heated under a nitrogen atmosphere to 105°-110° C., and monomer and initiator dissolved in solvent are added separately to the reaction vessel over a two hour period. Ten percent of the initiator in solvent is added over a one-half hour period as a chaser; and the contents of the vessel are held at the above temperature for one hour, cooled and discharged.

The components set forth in the following Table 1 are used to prepare the acid-functional, vinyl-type polymer according to the procedure described below.

TABLE 1

| Component | Example 1 Amount in grams (g) |
|---|---|
| Charge A | |
| Butanol | 750 g |
| Charge B | |
| Methyl methacrylate | 640 g |
| Butyl acrylate | 900 g |
| Acrylic acid | 240 g |
| A-174[1] | 220 g |
| Charge C | |
| VAZO 67[2] | 35 g |
| Butanol | 280 g |
| Charge D | |
| 2,2'-Azobis(methylbutyronitrile) | 5 g |

TABLE 1-continued

| Component | Example 1 Amount in grams (g) |
|---|---|
| Butanol | 40 g |

[1](3-Methacryloxypropyl)trimethoxysilane from Union Carbide Corp.
[2]2,2'-Azobis(methylbutyronitrile) from E. I. DuPont de Nemours and Company.

Add Charge A to the reaction vessel and heat to 105°-110° C. under nitrogen. Add Charges B and C simultaneously over a 2-3 hour period. Add Charge D over a 0.5 hour period and hold at 105°-110° C. for one hour. Thereafter, cool and discharge the contents of the vessel. The resulting polymer product solution has an acid number of 50.7, a percent by weight solids content (measured at 250° F. for 1 hour) of 65.1, a weight average molecular weight of 30,000 and a number average molecular weight of 8020 as measured by gel permeation chromatography using a polystyrene standard.

In a similar manner, the following products of examples 2 and 3 are prepared from the components as set forth in the following Table 2.

TABLE 2

| | Example 2 | Example 3 |
|---|---|---|
| Component | | |
| Charge A | | |
| Methylisobutyl ketone | 218.4 g | 0 g |
| Butanol | 358.4 g | 757 g |
| Charge B | | |
| Methylmethacrylate | 700 g | 360 g |
| Butylacrylate | 1080 g | 220 g |
| Butylmethacrylate | 0 g | 1120 g |
| Acrylic acid | 160 g | 80 g |
| A-174[1] | 60 g | 220 g |
| Charge C | | |
| VAZO 67[2] | 35 g | 35 g |
| Methylisobutyl ketone | 280 g | 269.3 g |
| Butanol | 0 g | 10.7 g |
| Charge D | | |
| VAZO 67[2] | 5 g | 5 g |
| Methylisobutyl ketone | 40 g | 0 g |
| Butanol | 0 g | 40 g |
| Polymer Product Characteristics | | |
| Acid Number of Product Solution | 33.4 | 18.9 |
| Percent by Weight Solids | 64.8 | 63.9 |
| Weight Average Molecular Weight[3] | 28000 | 22000 |
| Number Average Molecular Weight[3] | 8711 | 7778 |

[1](3-Methacryloxypropyl)trimethoxysilane from Union Carbide Corp.
[2]2,2'-Azobis(methylbutyronitrile) from E. I. DuPont de Nemours and Company.
[3]Determined by gel permeation chromatography using a polystyrene standard.

EXAMPLES 4 through 6

Examples 4 through 6 illustrate a typical procedure for the preparation of aqueous dispersions or solutions of the invention using the polymer products of examples 1 through 3 above.

A suitable container is fitted with a stirrer and is charged with an amount of water sufficient to give a final solids content of between 25 and 32 percent by weight. A base (e.g., NH$_3$ or dimethylethanol amine) is added to neutralize between 20 and 100 percent of the available acid on the polymer. With stirring, the polymer product as described in the examples above is added to the aqueous amine. The resulting waterborne dispersion can be adjusted to a lower viscosity with additional water or to a higher viscosity with additional amine.

According to the procedure described immediately above, the following waterborne dispersions of the invention are prepared from the components as set forth in the following Table 3.

TABLE 3

| Component | Example 4 | Example 5 | Example 6 |
|---|---|---|---|
| Product of Example 1 | 1242 g | 0 g | 0 g |
| Product of Example 2 | 0 | 1415 g | 0 |
| Product of Example 3 | 0 | 0 | 200 g |
| Ammonia[1] | 14.4 g | 19.8 g | 0 g |
| Dimethylethanol amine | 0 g | 0 g | 2.4 g |
| Water | 1257 g | 1591 g | 197 g |
| Adjustments | | | |
| Water | 0 g | 159 g | 0 g |
| Ammonia[1] | 8.0 g | 0 g | 0 g |
| Dispersion Product Characteristics | | | |
| Acid Number | 29.1 | 16.6 | 9.7 |
| Percent by Weight Solids | 31.0 | 28.7 | 32.7 |
| Amine Value (meq/g) | 0.139 | 0.107 | 0.075 |
| Percent Neutralization | 26.8% | 36.3% | 43.6% |

[1] A 28 percent by weight solution of ammonia in water.

EXAMPLE 7

This example illustrates a method of achieving high solids waterborne dispersion products of the invention by vacuum stripping of solvent.

A 2 gallon vessel is charged with 3273 g of deionized water and 32.4 g of a 29 percent by weight solution of ammonia in water. While the contents of the vessel are stirred, over a period of about 1 minute, is added 2680 g of a solution polymerized polymer product (prepared according to the procedure described in example 1 above utilizing methyl methacrylate, butyl acrylate, acrylic acid and gamma-methacryloxypropyl trimethoxy silane in the following percent by weight ratios respectively, 35:50:8:7, the polymer product having an acid value of 36.2 at a solids content of 60.3 percent by weight) to form an opaque, moderately viscous, dispersion. To a 12 liter flask equipped with a mechanical stirrer, a distillation receiver and condenser is added 5753 g of the opaque dispersion. A vacuum is applied to the stirred contents of the flask and heat is applied to effect distillation. Volatiles are distilled for 13 hours at 45° C. to 65° C. The total distillate collected has a mass of 2318 g. The resulting white, opaque dispersion has a Gardner-Holdt viscosity of E-F and a solids content of 46.6 percent by weight (measured at 110° C. for 1 hour).

EXAMPLE 8

This example illustrates the preparation, from only three reactive monomers, of a solution polymerized, acid-functional, vinyl-type polymer product and utilization of the polymer product to prepare an aqueous composition of the invention.

(a) To a reaction flask equipped with a mechanical stirrer, reflux condenser and thermometer is charged 141 g methylisobutyl ketone and 350 g n-butanol, and the contents of the flask are heated to reflux (113° C.). Over a 3 hour period, the following two solutions as set forth in the following Table 4 are added to the contents of the flask.

TABLE 4

| Component | Amount in grams (g) |
|---|---|
| Solution 1 | |
| Ethyl acrylate | 962 g |
| A-174[1] | 260 g |
| Acrylic acid | 78 g |
| Solution 2 | |

TABLE 4-continued

| Component | Amount in grams (g) |
|---|---|
| Methylisobutyl ketone | 150 g |
| VAZO 67[2] | 32.4 g |

[1] (3-Methacryloxypropyl)trimethoxysilane from Union Carbide Corp.
[2] 2,2'-Azobis(methylbutyronitrile) from E. I. DuPont de Nemours and Company.

The temperature gradually decreases over the 3 hour reaction period from 113° C. to 105° C. The temperature is maintained for 35 minutes. Thereafter, a solution consisting of 6.6 g of 2,2'-azobis(methylbutyronitrile) in 20 g of methylisobutyl ketone is added gradually over 15 minutes. The temperature of about 102° C. is held for 30 minutes followed by the addition over 15 minutes of a final solution of 6.6 g of 2,2'-azobis(methylbutyronitrile) in 20 g of methylisobutyl ketone. Thereafter, the temperature is maintained at about 101° C. for 1 hour after which period the product is cooled to room temperature. The resulting polymer product is in the form of a solution having a Gardner-Holdt viscosity of U-V, an acid value of 27.2 and a solids content of 64.4 percent by weight.

(b) To 850 g of water and 9.59 g of a 29 percent by weight solution of ammonia in water is added with stirring 750 g of the polymer product of part (a) immediately above to provide a total neutralization of 45 percent and a total solids content of 30 percent by weight. A milky dispersion results which has a medium viscosity (estimated to have a Gardner-Holdt viscosity value of about M). A 1550 g sample of the dispersion is stripped of solvents at 36° C. to 65° C. under vacuum with agitation to yield a dispersion with a Gardner-Holdt viscosity of less than A and a theoretical solids content of 41.8 percent by weight. This lower viscosity of the aqueous dispersion upon solvent stripping is a phenomenon useful in achieving higher solids compositions. This is one method that can be utilized to prepare aqueous dispersions of the invention having improved stability.

EXAMPLE 9

This example illustrates the preparation, using an acid anhydride, of a solution polymerized, acid-functional, vinyl-type polymer product and utilization of the polymer product to prepare an aqueous composition of the invention. It illustrates that a vinyl-type polymer product containing an anhydride instead of an acid can form a stable dispersion when put into water containing ammonia. (Without intending to be bound thereby, it is believed that the ammonia likely reacts with the anhydride forming an acid amide moiety which is neutralized with more ammonia to form the stable, aqueous polymer dispersion of the invention.)

(a) According to the procedure described in part (a) of example 8 above (except that butyl acetate is used in place of methylisobutyl ketone), the components as set forth in the following Table 5 are solution polymerized to form a vinyl-type polymer product.

TABLE 5

| Component | Amount in Percent by Weight |
|---|---|
| Butyl acrylate | 43 |
| Methyl methacrylate | 20 |
| Styrene | 15 |
| Maleic anhydride | 10 |
| A-174[1] | 12 |

[1] (3-Methacryloxypropyl)trimethoxysilane from Union Carbide Corp.

(b) To a mixture of 637.5 g of deionized water and 27.1 g of a 2.9 percent by weight solution of ammonia in water is added with mechanical stirring 152.5 g of the polymer product of part (a) immediately above. Within one minute of the aforesaid addition, 127 g of methylethyl ketone is added. Next, an additional 313.5 g of the polymer product of part (a) immediately above is added for a total mass of 466 g. Next an additional 206 g of water is added with stirring. The resulting dispersion (956.8 g) is vacuum stripped of solvent at 50 to 55 degrees Celsius to 28.8 percent by weight solids. Then water is added to achieve a solids content of 26.0 percent by weight. The Gardner-Holdt viscosity of the dispersion is H-I after 2 days storage at 120 degrees Fahrenheit. The dispersion is still stable after 22 days storage at room temperature.

EXAMPLE 10

This example illustrates the preparation of a solution polymerized, acid-functional, vinyl-type polymer product using an acid other than a carboxylic acid as stabilizing acid for the polymer product. It also illustrates utilization of the polymer product to prepare an aqueous composition of the invention.

(a) To a 3 liter reaction flask equipped with a mechanical stirrer, nitrogen atmosphere, reflux condenser and thermometer is charged 280.1 g n-butanol and 112 g methylisobutyl ketone, and the contents of the flask are heated to 85° C. Over a 3 hour period, the following two mixtures as set forth in the following Table 6 are added continuously and simultaneously to the contents of the flask.

TABLE 6

| Component | Amount in grams (g) |
| --- | --- |
| Mixture 1 | |
| Butyl acrylate | 424.2 g |
| Methyl methacrylate | 424.2 g |
| Sulfoethyl methacrylate | 40.4 g |
| A-174[1] | 121.2 g |
| n-Butanol | 99.6 g |
| Triethylamine | 21.1 g |
| Mixture 2 | |
| VAZO 52[2] | 25.2 g |
| Methylisobutyl ketone | 145.8 g |

[1](3-Methacryloxypropyl)trimethoxysilane from Union Carbide Corp.
[2]2,2'-Azobis(2,4-dimethylvaleronitrile) from E. I. DuPont de Nemours and Company.

After the addition of mixtures 1 and 2 is complete, the temperature is held at 86° C. for 30 minutes, after which a mixture of 5.1 g of 2,2'-azobis(2,4-dimethylvaleronitrile) in 22.2 g of methylisobutyl ketone is added over a period of 0.5 hour. Then, the temperature is held at 85° C. for 1.5 hours after which the contents of the flask are allowed to cool. The resulting polymer product is in the form of a solution having a Gardner-Holdt viscosity of Z1 and an acid number of 6.8.

(b) To 29.2 g of water in a glass container is added with stirring 25.0 g of the polymer product of part (a) immediately above to provide a total neutralization of 100 percent and a total solids content of 30 percent by weight. A paste-like, opaque dispersion results which becomes much lower in viscosity upon standing at room temperature for four days.

Similarly a second, milky white dispersion of the polymer product of part (a) immediately above is prepared at 15 percent by weight solids.

Additionally, a third dispersion is prepared by combining 29.2 g water, 7.4 g ethyleneglycol monobutyl ether and 31.3 g of the polymer product of part (a) immediately above to provide a total solids content of about 30 percent by weight.

Films drawn down on a metal substrate with a 10 mil drawbar and cured at room temperature for 3 days are soft and glossy. The cured films from the first and third dispersions (containing ethyleneglycol monobutyl ether) are glossier than that from the second dispersion.

EXAMPLE 11

This example illustrates the preparation of a solution polymerized, acid-functional, vinyl-type polymer product and utilization of the polymer product to prepare an aqueous dispersion. It illustrates the use of a hydrophilic monomer to replace a portion of the acid as a stabilizing moiety in the polymer product.

(a) The components as set forth in the following Table 7 are solution polymerized to form a vinyl-type polymer product according to the procedure described in part (a) of example 8 above except that during the monomer addition, sufficient excess butanol is utilized to achieve a theoretical solids content of 55 percent by weight.

TABLE 7

| Component | Amount in Percent by Weight |
| --- | --- |
| Butyl acrylate | 40 |
| Methyl methacrylate | 30 |
| Acrylic acid | 3 |
| A-174[1] | 11 |
| HEM-10[2] | 16 |

[1](3-Methacryloxypropyl)trimethoxysilane from Union Carbide Corp.
[2]An ethylenically unsaturated monomer available from Alcolac having the reported structure of $CH_2=C(CH_3)CO_2(CH_2CH_2O)_{10}H$.

The resulting polymer product has a Gardner-Holdt viscosity of X-Y, an acid number of 12.3 and a solids content of 53.9 percent by weight.

(b) An aqueous dispersion of the polymer product of part (a) immediately above is prepared by adding 25 g of the polymer product to 19.9 g of deionized water. A very viscous, white, opaque dispersion results. After one day at ambient temperature the dispersion appears viscous, white, opaque and somewhat "stringy".

A film drawn down with a 10 mil drawbar on a steel panel treated with an iron phosphate pretreatment (BONDERITE-1000) and allowed to cure at room temperature overnight results in a film which withstands 30 double rubs with a cloth dipped in methyl ethyl ketone before failure thus evidencing solvent resistance of a cured film.

Another aqueous dispersion of the polymer product of part (a) immediately above is prepared by adding 25 g of the polymer product to 19.6 g water and 0.32 g of a 29 percent by weight solution of ammonia in water resulting in a dispersion at 100 percent total neutralization with a solids content of 30 percent by weight. The aqueous dispersion is somewhat "stringy" and very viscous.

EXAMPLES 12 through 14

These examples illustrate the preparation of solution polymerized, acid-functional, vinyl-type polymer products and utilization of the polymer products to prepare aqueous compositions of the invention. They illustrate the use of a hydrophilic monomer to replace a portion of the acid in the polymer product.

(a) The components as set forth in the following Table 8 are solution polymerized to form a vinyl-type polymer products according to the procedure described in part (a) of example 8 above except that methanol is substituted for 150 g of the methylisobutyl ketone/butanol solvent. In Table 8 the following abbreviations are used: "MMA" means methyl methacrylate, "BA" means butyl acrylate, "ACAM" means acrylamide and "AA" means acrylic acid.

TABLE 8

| | Amount in Percent by Weight | | |
|---|---|---|---|
| | Example 12 | Example 13 | Example 14 |
| Component | | | |
| MMA | 38 | 19 | 22 |
| BA | 19 | 38 | 45 |
| ACAM | 20 | 20 | 10 |
| A-174[1] | 15 | 15 | 15 |
| AA | 8 | 8 | 8 |
| Polymer Product Characteristics | | | |
| Solids | 52.7 | 52.6 | 43.5 |
| Acid Number | 26.5 | 27.4 | 24.0 |
| Viscosity[2] | —[3] | — | Q-R |

[1](3-Methacryloxypropyl)trimethoxysilane from Union Carbide Corp.
[2]Gardner-Holdt viscosity.
[3]Not measured.

(b) Three aqueous dispersions (identified herein as 13A, 13B and 13C respectively) of the polymer product of part (a) of Example 13 immediately above are prepared from the components as set forth in the following Table 9. In Table 9 the following abbreviations are used: "DMEA" means dimethylethanol amine, "DW" means deionized water, "% TN" means percent of total neutralization, "NC" means nearly clear, "SH" means slightly hazy, "ML" means milk-like and "H" means hazy.

TABLE 9

| | Dispersion | | |
|---|---|---|---|
| | 13A | 13B | 13C |
| Component | Amounts in Grams | | |
| Ex. 13 Product | 50 | 50 | 50 |
| DMEA | 0.8 | 0.33 | 0.48 |
| DW | 57.6 | 57.6 | 57.6 |
| % TN | 30 | 15 | 22 |
| % Solids | 25 | 25 | 25 |
| Appearance | NC, SH | ML | H |

Similar resins containing no acrylamide are quite opaque at 30 percent total neutralization, i.e. 30% TN, (compare with 13A above) indicating that the acrylamide is helping to solubilize the polymer product in water. It is believed that the nearly clear dispersion suggests more soluble, smaller-sized, particles of polymer product in the dispersion.

(c) Six aqueous dispersions (identified herein as 14A, 14B, 14C, 14D, 14E and 14F respectively) of the polymer product of part (a) of Example 14 immediately above are prepared at 25 percent by weight solids utilizing ammonia or monoethanol amine from the components as set forth in the following Table 10. The dispersions are prepared by slowly pouring the sample of polymer product into a mixture of the water and base while stirring. In Table 10 the following abbreviations are used: "MEA" means monoethanol amine, "NH4OH" means ammonia water, "DW" means deionized water, "% TN" means percent of total neutralization, and "% TS" means percent total solids.

TABLE 10

| | Dispersion | | | | | |
|---|---|---|---|---|---|---|
| | 14A[1] | 14B | 14C | 14D | 14E | 14F |
| Component | Amounts in Grams | | | | | |
| Ex. 13 Product | 50 | 50 | 50 | 50 | 50 | 50 |
| MEA | 0.65 | 0.33 | 0.16 | 0 | 0 | 0 |
| NH4OH | 0 | 0 | 0 | 0.64 | 0.32 | 0.15 |
| DW | 39.0 | 38.0 | 37.5 | 38.9 | 38.0 | 37.5 |
| % TN | 50 | 25 | 12 | 50 | 25 | 12 |
| % TS | 25.0 | 25.0 | 25.0 | 25.0 | 25.0 | 25.0 |

[1]Dispersion 14A gelled within 24 hours.

Films of dispersions 14B, 14C, 14D, 14E and 14F are drawn down with a 10 mil drawbar on steel panels treated with an iron phosphate pretreatment (BONDERITE-1000) and allowed to cure at room temperature for three days. The films are then observed for appearance and hardness. All of the films appear cured through their thickness and are soft meaning that they can be marred by scratching with a fingernail. The cured films from dispersions 14B and 14D are smooth in appearance (114D also having some craters). The cured films from dispersions 14C, 14E and 14F are rough in appearance meaning that they look "grainy".

Five days after the preparation of dispersions 14B, 14C, 14D, 14E and 14F, their appearance is observed. Dispersions 14B and 14D appear homogeneous while dispersions 14C, 14E and 14F appear to have separated into two layers. The viscosities of dispersions 14B and 14D, measured using a Brookfield viscometer with a No. 2 spindle operating at 60 revolutions per minute, are determined to be 89.3 and 87.5 centipoise respectively.

EXAMPLE 15

This example illustrates the preparation of a solution polymerized, acid-functional, vinyl-type polymer product and utilization of the polymer product to prepare an aqueous composition of the invention. The vinyl-type polymer is prepared by copolymerizing an ethylenically unsaturated anhydride along with other vinyl-type monomers and thereafter reacting anhydride functionality from the resulting intermediate product with amino functionality from an amino-functional compound containing hydrolyzable silyl groups to produce the vinyl-type polymer product for preparation of an aqueous composition of the invention.

(a) To 342.1 g of methylisobutyl ketone refluxing at 115° C. in a 3 liter flask are added simultaneously and continuously over a three hour period the two solutions as set forth in the following Table 11.

TABLE 11

| Component | Amount in grams (g) |
|---|---|
| Solution 1 | |
| Styrene | 141.4 g |
| Methylmethácrylate | 377.7 g |
| Methylme Butylacrylate | 393.9 g |
| Maleic anhydride | 101.0 g |
| Solution 2 | |
| t-Amylperoxy-2-ethylhexanoate[1] | 25.2 g |
| Methylisobutyl ketone | 145.0 g |

[1]Available as LUPERSOL 575 from Pennwalt Corp.

After holding the contents of the flask at a temperature of from 118° C. to 119° C. for 30 minutes, a solution consisting of 3.1 g of t-amylperoxy-2-ethylhexanoate in 22.2 g of methylisobutyl ketone is added over a period of eight minutes at 118° C. The contents of the flask are maintained at 118° C. to 119° C. 1.5 hours, and then are cooled to room temperature to yield an intermediate polymer product in the form of a solution having a Gardner-Holdt viscosity of Z1-Z2, an acid number of 37.1, a solids content of 63.6 percent by weight (measured at 110° C. for 1 hour) and a number average molecular weight of 7848 determined by gel permeation chromatography utilizing a polystyrene standard.

(b) To 64.7 g of the intermediate polymer product of part (a) immediately above, are added 12.4 g of methylisobutyl ketone, 3.79 g of gamma-aminopropyl trimethoxy silane and 17.1 g of n-butanol and the resulting mixture is allowed to stand at room temperature under a nitrogen atmosphere for about 24 hours to give a vinyl-type polymer product for use in the preparation of an aqueous composition of the invention.

(c) To 23.6 g of the vinyl-type polymer product of part (b) immediately above, is added with stirring a solution consisting of 4.1 g of a 2.9 percent by weight ammonia water solution and 29.4 g of deionized water. Next, 6.2 g of ethylene glycol monobutyl ether is added. The resulting dispersion in water is vacuum stripped at 50° C.-60° C. to yield a viscous, aqueous dispersion of the invention having a solids content of 25 percent by weight. The viscous dispersion in a sealed container does not visibly change viscosity during a 24 hour storage period at 120° F.

What is claimed is:

1. A stable, aqueous, colloidal silica-free, dispersion or solution containing a solution-polymerized vinyl-type polymer which is formed by addition polymerization of components in the presence of a vinyl polymerization initiator, the polymer having acid functionality sufficient to provide an acid value of from 5 to 160 and having a hydroxyl value of less than or equal to 10 and sufficient hydrolyzable silyl groups to provide a Si content in the range of from 0.40 to 6.0 percent by weight based on the total weight of said vinyl-type polymer, said vinyl-type polymer being further characterized in that a composition consisting of at least 25 percent by weight of said polymer in water remains stable in a closed container for at least 24 hours at a temperature of 48.9 degrees Celsius.

2. The aqueous dispersion or solution of claim 1 wherein the Si atoms of said hydrolyzable silyl groups are separated by at least two atoms from the backbone of said vinyl-type polymer.

3. The aqueous dispersion or solution of claim 1 wherein said solution polymerized vinyl-type polymer prior to dispersion in water has a number average molecular weight of less than or equal to 12,000 as determined by gel permeation chromatography utilizing a polystyrene standard.

4. The aqueous dispersion or solution of claim 1 wherein a 3 ml thick film of said aqueous dispersion or solution containing an amount of basic catalyst of from 0.1 to 3.0 milliequivalent/gram of polymer cures in air to a solvent resistant film at a temperature of less than 80 degrees Celsius.

5. The aqueous dispersion or solution of claim 4 wherein said film cures in air to a solvent resistant film at equal to or less than 25 degrees Celsius.

6. The aqueous dispersion or solution of claim 1 wherein said solution-polymerized vinyl-type polymer is prepared from the copolymerization of components comprising an ethylenically unsaturated silane monomer containing at least one hydrolyzable silyl group, an ethylenically unsaturated acid and/or anhydride thereof, and at least one other copolymerizable vinyl-type monomer.

7. The aqueous dispersion or solution of claim 1 wherein said solution-polymerized vinyl-type polymer is prepared from the copolymerization of components comprising an ethylenically unsaturated anhydride and at least one other copolymerizable vinyl-type monomer wherein amino functionality of an amino-functional compound containing at least one hydrolyzable silyl group has been reacted with an anhydride group of said vinyl-type polymer.

8. The aqueous dispersion or solution of claim 6 wherein said solution polymerized vinyl-type polymer prior to dispersion in water has a number average molecular weight of less than or equal to 12,000 as determined by gel permeation chromatography utilizing a polystyrene standard.

9. The aqueous dispersion or solution of claim 6 wherein said vinyl-type polymer is prepared from components comprising from 5 to 13 percent by weight of said ethylenically unsaturated acid and/or acid anhydride thereof, from 12 to 87 percent by weight of said other copolymerizable vinyl-type monomer, said percentages being based on the total weight of copolymerizable monomers used in the preparation of said vinyl-type polymer, and an amount of said ethylenically unsaturated silane monomer to provide said Si content.

10. The aqueous dispersion or solution of claim 9 wherein said unsaturated acid and/or acid anhydride comprises a carboxylic acid and/or acid anhydride.

11. The aqueous dispersion or solution of claim 9 containing at least a catalytically effective amount of a base for curing a wet film from said aqueous dispersion which is an amount of basic catalyst of from 0.1 to 3.0 milliequivalents/gram of the solution polymerized vinyl-type polymer.

12. A stable, aqueous, colloidal silica-free, coating composition having a total organic resin solids content of greater than or equal to 25 percent by weight, at least 50 percent by weight of said total organic resin solids content consisting of a solution-polymerized vinyl-type polymer which is formed by addition polymerization of components in the presence of a vinyl polymerization initiator, the polymer having acid functionality sufficient to provide an acid value of from 5 to 160 and having a hydroxyl value of less than or equal to 10 and sufficient hydrolyzable silyl groups to provide a Si content in the range of from 0.40 to 6.0 percent by weight based on the total weight of said vinyl-type polymer, said vinyl-type polymer being further characterized in that a composition consisting of at least 25 percent by weight of said polymer in water remains stable in a closed container for at least 24 hours at a temperature of 48.9 degrees Celsius.

13. The coating composition of claim 12 wherein the Si atoms of said hydrolyzable silyl groups are separated by at least two atoms from the backbone of said vinyl-type polymer.

14. The coating composition of claim 12 wherein said solution polymerized vinyl-type polymer prior to dispersion in water has a number average molecular weight of less than or equal to 12,000 as determined by gel permeation chromatography utilizing a polystyrene standard.

15. The coating composition of claim 12 wherein a 3 mil thick film of said composition containing an amount of basic catalyst of from 0.1 to 3.0 milliequivalent/gram of said vinyl-type polymer cures in air to a solvent resistant film at a temperature of less than 80 degrees Celsius.

16. The coating composition of claim 12 wherein said film cures in air to a solvent resistant film at equal to or less than 25 degrees Celsius.

17. The coating composition of claim 12 wherein said solution-polymerized vinyl-type polymer is prepared from the copolymerization of components comprising an ethylenically unsaturated silane monomer containing at least one hydrolyzable silyl group, an ethylenically unsaturated acid and/or anhydride thereof, and at least one other copolymerizable vinyl-type monomer.

18. The coating composition of claim 12 wherein said solution-polymerized vinyl-type polymer is prepared from the copolymerization of components comprising an ethylenically unsaturated anhydride and at least one other copolymerizable vinyl-type monomer wherein amino functionality of an amino-functional compound containing at least one hydrolyzable silyl group has been reacted with an anhydride group of said vinyl-type polymer.

19. The coating composition of claim 17 wherein said solution polymerized vinyl-type polymer prior to dispersion in water has a number average molecular weight of less than or equal to 12,000 as determined by gel permeation chromatography utilizing a polystyrene standard.

20. The coating composition of claim 17 wherein said vinyl-type polymer is prepared from components comprising from 5 to 13 percent by weight of said ethylenically unsaturated acid and/or acid anhydride thereof, from 12 to 87 percent by weight of said other copolymerizable vinyl-type monomer, said percentages being based on the total weight of copolymerizable monomers used in the preparation of said vinyl-type polymer, and an amount of said ethylenically unsaturated silane monomer to provide said Si content.

21. The coating composition of claim 20 wherein said unsaturated acid and/or acid anhydride comprises a carboxylic acid and/or acid anhydride.

22. The coating composition of claim 20 containing at least a catalytically effective amount of a base for curing a wet film from said aqueous dispersion.

23. A stable aqueous, colloidal silica free, dispersion or solution containing a solution-polymerized vinyl-type polymer which is formed by addition polymerization of components in the presence of a vinyl polymerization initiator, the polymer having acid functionality sufficient to provide an acid value of from 5 to 160 and having a hydroxyl value of less than or equal to 10 and sufficient hydrolyzable silyl groups to provide a Si content in the range of from 0.40 to 6.0 percent by weight based on the total weight of said vinyl-type polymer, said vinyl type polymer being further characterized in that a composition consisting of at least 25 percent by weight of said polymer in water remains stable in a closed container for at least 24 hours at a temperature of 48.9 degrees Celsius, said vinyl type polymer being further characterized in that it is capable of forming a cured film in the absence of amino crosslinking resin.

24. A stable, aqueous, colloidal silica-free, coating composition having a solution-polymerized vinyl-type polymer which is formed by addition polymerization of components in the presence of vinyl polymerization initiator, the polymer having acid functionality sufficient to provide an acid value of from 5 to 160 and having a hydroxyl value of less than or equal to 10 and sufficient hydrolyzable silyl groups to provide a Si content in the range of from 0.40 to 6.0 percent by weight base on the total weight of said vinyl-type polymer, said vinyl type polymer being further characterized in that a composition consisting of at least 25 percent by weight of said polymer in water remains stable in a closed container for at least 24 hours at a temperature of 48.9 degrees Celsius, said vinyl type polymer being further characterized in that it is capable of forming a cured film in the absence of amino crosslinking resin.

* * * * *